FRANKLIN, HASTINGS & HOLFORD.
Corn Planter and Plow.
No. 83,271.
Patented Oct. 20, 1868.
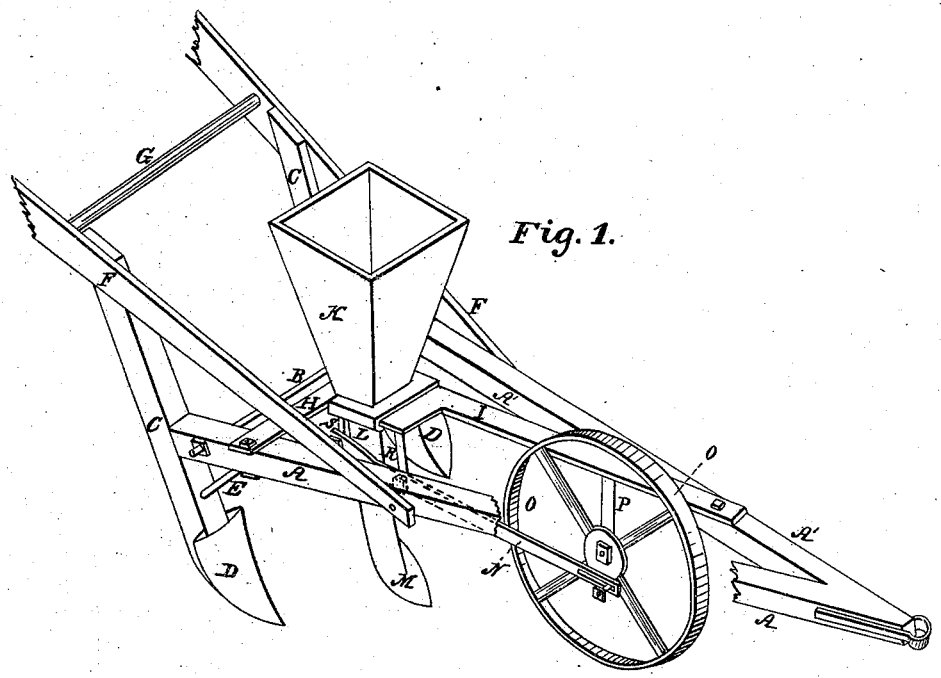
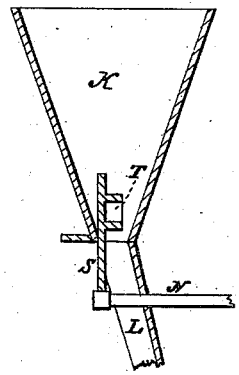

A. M. FRANKLIN, W. J. HASTINGS, AND J. A. HOLFORD, OF RISING SUN, INDIANA.

Letters Patent No. 83,271, dated October 20, 1868.

IMPROVEMENT IN COMBINED CORN-PLANTER AND SHOVEL-PLOW.

The Schedule referred to in these Letters Patent and making part of the same.

*To all whom it may concern:*

Be it known that we, A. M. FRANKLIN, W. J. HASTINGS, and J. A. HOLFORD, of Rising Sun, in the county of Ohio, and in the State of Indiana, have invented certain new and useful Improvements in Combined Corn-Planter and Shovel-Plow; and do hereby declare that the following is a full, clear, and exact description thereof, reference being had to the accompanying drawings, and to the letters of reference marked thereon.

The nature of our invention consists in the construction of a double-shovel plow, combined with a corn-planter, which latter can be removed at pleasure.

In order to enable others skilled in the art to which our invention appertains to make and use the same, we will now proceed to describe its construction and operation, referring to the annexed drawings, which form a part of this specification, and in which—

Figure 1 is a perspective view, and

Figure 2 a sectional side view of the movable planter.

A A' represent two beams, joined together at the front end, where the team is attached, and separating a suitable distance at the rear ends. Near the rear ends of the bars A A', a brace, B, is placed, holding them firmly, and at the ends are secured the shins C C, to the lower ends of which the shovel-plows D D are secured.

The upper ends of the shins C C are secured to the braces F F, which, at their rear ends, form the handles for the plow, and at their front ends are attached to the beams A A'.

A cross-bar, G, connects the handles of the plow, and braces E E connect the shins C C with the beams A A', as seen in fig. 1.

At a suitable distance in front of the shins C C, and on top of the beams A A', is placed a cross-bar, H, from which another bar, I, extends forward, this latter being secured to the front part of the beam A'.

The bar I, where it joins the cross-bar H, forms a platform, on which rests a hopper, K, provided with a hole in its bottom, corresponding with a similar opening in the platform, and from the bottom or lower side of said platform a metal sheath, L, descends, which, at its lower end, forms a plow, M.

The opening in the bottom of the hopper is closed by a bar, S, which moves up and down by the rotary motion of a wheel, O, which supports the front end of the machine, when used as a planter. This wheel moves between the beams A A', being attached to a bar, P, which descends from the bar I. A lever, N, connects the wheel O with the bar S, said lever being pivoted to a standard, K, as seen in fig. 1.

The bar S is provided with a box, T, open at one side, which carries the corn down through the hopper.

It will be seen that, by each revolution of the wheel O, the box T is raised above the bottom of the hopper, receiving as much corn as is desired to plant in each hill, and, at the downward movement of the bar S, as soon as the box arrives below the hopper, that corn drops out in the sheath L, and falls into the furrow prepared by the plow M.

By removing the bolts or screws which fasten the cross-bar H and bar I to the beams A A', the whole planter can be taken off, and the machine becomes a double-shovel plow.

Having thus fully described our invention,

What we claim as new, and desire to secure by Letters Patent, is—

1. The combination of the hopper K, wheel O, lever N, bar S, and box T, all constructed as described, and supported by the cross-bar H and bar I, substantially as and for the purposes herein set forth.

2. A double-shovel plow, in combination with a movable corn-planter, when both are constructed substantially as herein described, and operating as and for the purposes set forth.

In testimony that we claim the foregoing, we have hereunto set our hands, this 5th day of August, 1868.

A. M. FRANKLIN.
W. J. HASTINGS.
J. A. HOLFORD.

Witnesses:
H. P. McQURTHY,
R. L. DAVIS.